United States Patent [19]

Burge

[11] 3,972,343

[45] Aug. 3, 1976

[54] SHUTTLE VALVE

[75] Inventor: Donald G. Burge, Plainwell, Mich.

[73] Assignee: Parker-Hannifin Corporation, Cleveland, Ohio

[22] Filed: Feb. 17, 1976

[21] Appl. No.: 658,189

Related U.S. Application Data

[63] Continuation of Ser. No. 523,463, Nov. 13, 1974, abandoned.

[52] U.S. Cl. .............................. 137/112; 285/334.4

[51] Int. Cl.² ............................................ G05D 7/01

[58] Field of Search ........................... 137/112, 113; 285/334.4

[56] References Cited

UNITED STATES PATENTS

| | | | |
|---|---|---|---|
| 1,686,310 | 10/1928 | Beebe | 137/113 |
| 2,237,014 | 4/1941 | Stoehrer | 137/112 |
| 2,354,791 | 8/1944 | Boldt | 137/112 |
| 2,627,388 | 2/1953 | Johnson et al. | 137/112 |
| 2,821,972 | 2/1958 | Banker | 137/112 |
| 3,285,627 | 11/1966 | Kozulla et al. | 285/334.4 |
| 3,338,257 | 8/1967 | Ferguson | 137/112 |

FOREIGN PATENTS OR APPLICATIONS

| | | | |
|---|---|---|---|
| 615,759 | 9/1959 | Italy | 137/112 |

*Primary Examiner*—William R. Cline
*Assistant Examiner*—H. Jay Spiegel
*Attorney, Agent, or Firm*—John N. Wolfram

[57] ABSTRACT

A shuttle valve comprising a body having a longitudinal bore and coaxial first and second counterbores, a sleeve having a first portion press fitted into one of the counterbores and a second portion having a slip fit in the other counterbore. The sleeve has a bore therethrough and there is a valve element movable within the smaller counterbore for alternately opening and closing the body bore and the sleeve bore with respect to a transverse port that intersects the smaller counterbore. The sleeve has a tapered surface where it is press fitted into the smaller counterbore and the sleeve has a tapered shoulder that engages a tapered shoulder between the two counterbores to seal the sleeve within the body.

1 Claim, 2 Drawing Figures

SHUTTLE VALVE

This is a continuation of application Ser. No. 523,463, filed Nov. 13, 1974, now abandoned.

BACKGROUND OF THE INVENTION

It is known to provide shuttle valves in which a valve element is slidable between axially aligned bores for alternately opening and closing each axial bore with respect to a transverse port located between the two bores, as for example those disclosed in U.S. Pat. Nos. 2,408,799 and 2,206,957. In such prior arrangements at least one of the axial bores is provided in a sleeve or adaptor that is assembled to a body member and there being a counterbore larger in diameter than the axial bores and in which counterbore the valve element is fitted with a close sliding clearance. However, in such prior arrangements a simple construction is lacking in which the sleeve is mounted so that its bore will be concentric with the other bore to a high degree of accuracy and wherein the sleeve is sealed at at least two locations relative to the body for greater assurance against leakage between the sleeve and body.

SUMMARY OF THE INVENTION

The present invention provides a shuttle valve in which a body has a longitudinal bore followed by a first counterbore larger than the bore and a second counterbore larger than the first counterbore and with transverse shoulders at the inner end of each counterbore. A sleeve has a first portion press fitted into the first counterbore and forms a first seal therebetween and has a second portion that has a close slip fit in the second counterbore. The sleeve also has a tapered shoulder between the first and second portions that is engageable with a tapered shoulder between the first and second counterbores to provide a second seal between the sleeve and body. A valve element is within the first counterbore with a close fit and is movable to alternately open and close the body and sleeve bores relative to a transverse port that intersects the first counterbore.

DETAIL DESCRIPTION

Figure 1:
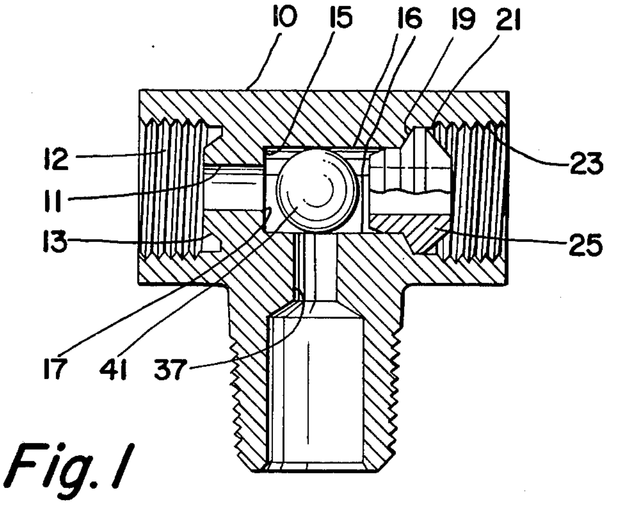
FIG. 1 is a vertical cross section view through the valve body and showing the sleeve in one-quarter section.

Body 10 has a longitudinal bore 11 that terminates at one end in a threaded counterbore 12 that is adapted to receive a threaded nut for clamping a flared tube against a tapered seat 13 at the inner end of threaded counterbore 12. The other end of body bore 11 intersects a traverse bottom end wall 15 of a first counterbore 16 that is larger than bore 11, the intersection of bore 11 with wall 15 providing a valve seat 17.

The other end of first counterbore 16 terminates at a tapered annular shoulder 19 that forms the inner end wall of a second counterbore 21 which leads to another threaded port 23 to which a nut may also be attached for mounting another flared tube to the body.

A sleeve 25 has a first portion 26 with a first tapered section 28 whose largest diameter is slightly larger than the diameter of first counterbore 16 and whose smaller diameter is slightly smaller than the diameter of first bore 16. Tapered section 28 preferrably makes an angle of about 2° with the longitudinal axis of sleeve 25. Sleeve portion 26 also has a second tapered surface 29 at its outer end that makes an angle of about 15° with the longitudinal axis of sleeve 25 and all portions of which are of smaller diameter than first counterbore 16.

The second portion 27 of sleeve 25 has an outside diameter that is a close sliding fit within body second counterbore 21 and it has a tapered shoulder 31 of about 30° to a transverse plane and which is the same as the taper of body shoulder 19. An outer tapered surface 33 on sleeve 25 corresponds with taper 13 and serves as a face against which a flared tube may be clamped.

An inner transverse face 34 on sleeve 25 intersects a bore 35 through the sleeve to form a valve seat 36.

Figure 2:
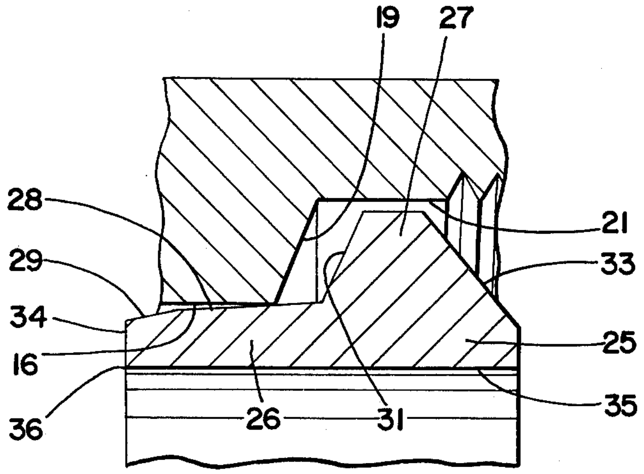
FIG. 2 is a fragmentary cross section showing the initial relationship between the sleeve and body counterbores before the sleeve is press fitted into the body.

From the loose assembly position of FIG. 2 in which sleeve 25 is in its initial condition, the sleeve is pressed into body bore 16 to the position shown in FIG. 1 in which tapered surface 28 of the sleeve makes sealing contact with the wall of bore 16 and sleeve shoulder 31 makes sealing contact with body shoulder 19. The press fit between tapered surface 28 and body counterbore wall 16 also serves to retain sleeve 25 within body 10. The clearance between the outer diameter of sleeve portion 27 and counterbore wall 21 permits the sleeve to center itself within counterbore 16 so that sleeve bore 35 will be concentric with counterbore wall 16 to a high degree of accuracy.

Mounted within counterbore 16 is a valve element 41 that preferrably is in the form of a ball and which has a close guiding fit within counterbore 16 so that it is readily movable from a first position in which it fits against seat 17 to close body bore 11 and permit fluid flow between sleeve bore 35 and transverse port 37 to a second position where it fits against seat 36 on sleeve 25 to close sleeve bore 35 and open body bore 11 to transverse port 37.

In operation of the valve, when fluid under pressure is admitted to port 12 it moves valve element 41 against seat 36 to establish flow of fluid from port 12 to port 37 and shutting off port 23. When the fluid under pressure is directed to port 23 instead of port 12 it moves the valve element against seat 17 to shut off port 12 and establish flow from port 23 to port 37.

I claim:

1. A shuttle valve comprising a body having a longitudinally extending bore and a first counterbore coaxial with said bore and of larger diameter than said bore, one end of said counterbore intersecting the bore in a transverse plane to form a first inlet valve seat at said intersection, a second counterbore in said body axially aligned with said first counterbore and of larger diameter thereof whereby the inner end of the second counterbore terminates in an annular shoulder adjoining and surrounding the first counterbore, a sleeve having a first portion press fitted within the other end of the first counterbore in sealing contact therewith and having a bore therethrough of substantially the same diameter as said body bore in axial alignment therewith, the inner end of said first portion intersecting said sleeve bore in transverse plane to form a second inlet valve seat at the latter intersection, said sleeve having a second portion of larger diameter than the first portion to form a shoulder therebetween that engages said annular shoulder in sealing contact therewith, said sleeve having a first tapered outer surface at an angle of about 2° with the longitudinal axis of the sleeve and whose end remote from said second portion is initially smaller in diameter than said first counterbore and whose end adjacent said second portion is initially larger in diameter than the diameter of said first counterbore whereby said press fitting and said first mentioned sealing contact is immediately adjacent said sleeve second portion and said annular shoulder, said body having a single outlet port transversely intersecting said first counterbore between said first and second seats and a valve element within said first counterbore and having a diameter that is a close slide fit with the wall of said first counterbore, said valve element being movable from a first position directly against said first valve seat wherein the valve element closes off inlet fluid flow through said body bore and permits fluid flow from said sleeve bore to said outlet port to a second position directly against said second valve seat wherein the valve element closes off inlet fluid flow through said sleeve bore and permits fluid flow from said body bore to said outlet port, and said body annular shoulder is tapered at an angle of about 30° to a transverse plane and said sleeve shoulder has a corresponding taper.

* * * * *